June 11, 1935.  C. M. RICE  2,004,831
AUTOMOBILE HEADLIGHT
Filed Oct. 13, 1934   2 Sheets-Sheet 1

Inventor
C. M. Rice

By Clarence A. O'Brien
Attorney

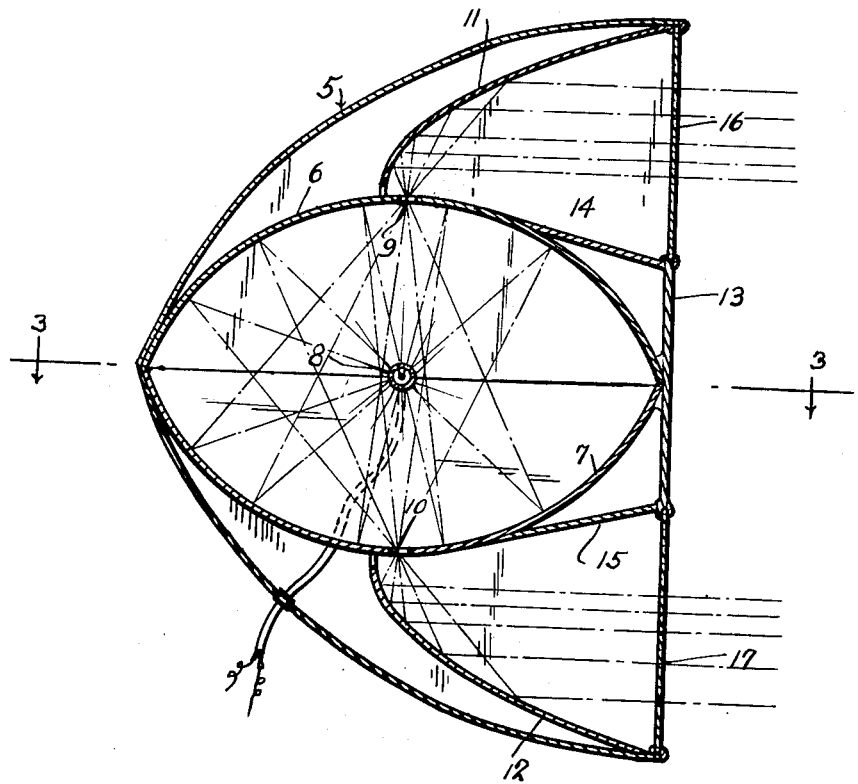

Patented June 11, 1935

2,004,831

UNITED STATES PATENT OFFICE 2,004,831

AUTOMOBILE HEADLIGHT

Clifford Mercer Rice, Daytona Beach, Fla.

Application October 13, 1934, Serial No. 748,254

1 Claim. (Cl. 240—41.1)

This invention relates to automobile headlights which, as is the present practice, are used in pairs.

An object of the invention is to provide an automobile headlight which will insure clear vision of the roadway to the driver of the automobile and which at the same time will not present a glare to the vision of the driver of an automobile approaching in an opposite direction.

Further objects of the invention are to provide an automobile headlight which will promote safe driving, being free of the glare which now characterizes present day types of headlights.

The invention together with its objects and advantages will be best understood from a study of the following description taken in connection with the accompanying drawings, wherein:

Figure 2 is a vertical sectional view through the headlight, and

Figures 1, 3:
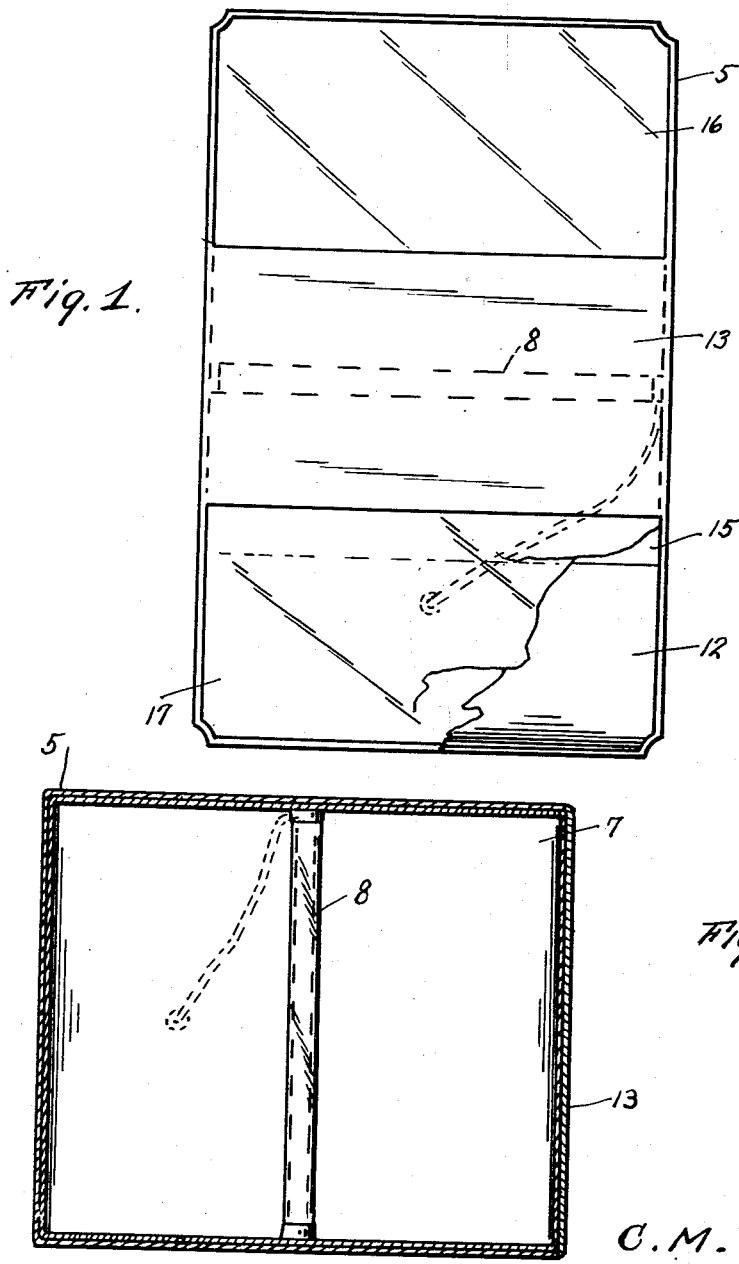
Figure 1 is a front elevational view of the improved headlight.
Figure 3 is a horizontal sectional view taken substantially on the line 3—3 of Figure 2.

Referring to the drawings by reference numerals, the numeral 5 indicates a headlight casing or housing in which my reflectors 6, 7, 11 and 12 are positioned. The light 8, which is of elongated tubular construction and extends transversely of the housing or casing 5 is positioned within and entirely enclosed by the two substantially cylindro-semi-elliptical reflectors 6 and 7, the light being on the common focus of the two reflectors.

The reflectors 6 has a secondary focus at opening 10 in the reflector 7; and the reflector 7 has a secondary focus at opening 9 in the reflector 6. These openings 10, 9, allow the focused rays of the reflectors 6 and 7 to pass outwardly, to be reflected from the parabolic reflectors 11 and 12 in parallel rays.

As indicated in the drawings the rays of light are converged through the foci 9 and 10 and are reflected by the parabolic reflectors 11 and 12 in beams parallel to the axis of the projector so that there is on diffusion of light.

Extending across the front of the casing 5 intermediate the top and bottom of the casing is a transverse plate 13 of metal or other suitable material. The plate 13 at its upper and lower edges are secured to webs 14 and 15 in any suitable manner preferably by being integral therewith. These webs 14 and 15 extend forwardly from the reflectors 6 and 7 as shown.

Disposed above and below the plate 13 and closing the reflectors 11 and 12 are transparent cover plates 16 and 17. The cover plates 16 and 17 are provided to throw light on the road in front of the automobile.

Preferably the rear portion of the reflectors 6 and 7 are painted black or otherwise provided to present dark surfaces for imparting to the light a darkened appearance.

Having thus described the invention, what is claimed as new is:

The herein described automobile headlight comprising a casing, an elongated light source of cylindrical shape mounted transversely in the casing, a pair of cylindro-semi-elliptical reflectors surrounding said light source, the light source extending from side to side of said reflectors, and the rear portions of said reflectors being provided with dark surfaces; secondary cylindro-parabolic reflectors arranged above and below said cylindro-semi-elliptical reflectors, said cylindro-semi-elliptical reflectors having apertures formed therein whereby the light rays from the said elliptical reflectors are focused to pass outwardly through said apertures to be reflected outwardly by the secondary cylindro-parabolic reflectors; and said casing having an open front side, a transverse opaque plate spaced from the upper and lower portions of the casing and extending across said front side, and transparent plates closing the front side of the casing above and below said transparent plate and covering said parabolic reflectors.

CLIFFORD MERCER RICE.